United States Patent Office 3,205,271
Patented Sept. 7, 1965

3,205,271
CYCLOHEXYL PHENOLS
George G. Ecke, Penn Hills Township, and Alfred J. Kolka, Pittsburgh, Pa., assignors to Ethyl Corporation, New York, N.Y., a corporation of Virginia
No Drawing. Filed May 17, 1960, Ser. No. 29,561
1 Claim. (Cl. 260—619)

The process of this invention is more fully described in our prior co-pending application, Serial No. 751,847, filed July 30, 1958, of which this application is a continuation-in-part, now U.S. Patent 3,075,832, issued January 29, 1963.

The present invention deals in general with a novel class of compounds and their use as antioxidants. More particularly, this invention is concerned with a novel and unusual class of substituted phenolic compounds and the employment of these compounds as stabilizers and antioxidants for organic material.

It is the object of this invention to provide a novel class of chemical compounds. A further object of this invention is to provide novel compositions of matter comprising organic material stabilized against oxidative deterioration. A particular object of this invention is to provide high molecular weight unsaturated polymers of enhanced stability.

The above and other objects of this invention are accomplished by a phenolic compound having the formula:

(I)
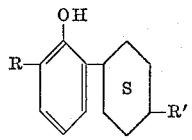

where R is selected from the class consisting of aralkyl groups having from 8 to about 18 carbon atoms and alkyl groups having from one to about 12 carbon atoms; R' is hydrogen or an alkyl radical having from one to about 9 carbon atoms and the S indicates a saturated cyclohexyl ring. These compounds are crystalline solids or high boiling liquids and have the advantage of good solubility in a large number of organic solvents. Examples of the compounds of this invention include 2-tert-octyl-6-cyclohexylphenol, 2-sec-eicosyl - 6 - cyclohexylphenol, 2-(α-isopropyl-p-nonylbenzyl) - 6 - (4 - isopropylcyclohexyl)-phenol, 2-tert-amyl-6-(2-methylcyclohexyl) - phenol, 2-methyl-6-cyclohexylphenol, 2-ethyl - 6 - cyclohexylphenol, 2-tertbutyl-6-cyclohexylphenol, 2-isopropyl - 6 - cyclohexylphenol, 2-(2-hexyl) - 6 - (4-cyclohexylcyclohexyl)-phenol.

These compounds are particularly suited as antioxidants since they possess the requisite properties of solubility, compatibility and volatility in addition to exhibiting a high degree of antioxidant effectiveness. These properties are in part provided by the o-cyclohexyl group and the absence of a substituent in the position para to the hydroxyl group. To illustrate the importance of the properties of volatility and solubility, the role of antioxidants in polyethylene, rubber and lubricating oil may be cited. Solubility is obviously of great importance in the lubricating oil; if the antioxidant is not sufficiently soluble in the oil it cannot perform its function. Volatility is important in all of the above mentioned substrates, but for somewhat different reasons. In a lubricating oil in service at high temperatures an additive with excessive volatility will soon completely disappear, while in rubber or polyethylene an antioxidant with insufficient volatility will not migrate to the surface to combat the main source of oxygen attack.

The compounds of this invention are liquids or crystalline solids which are soluble in various organic solvents.

Preferred embodiments of this invention consists of those compounds in which R, in the formula first appearing above, is an alkyl group having from one to 4 carbon atoms and R' is hydrogen. The particularly preferred alkyl groups represented by R are the methyl group, the isopropyl group and the tertiary butyl group. These are preferred because of their outstanding antioxidant activity. These preferred compounds are 6-cyclohexyl-o-cresol, 2-tert-butyl - 6 - cyclohexylphenol, and 2-isopropyl-6-cyclohexylphenol.

The compounds of this invention are readily prepared by reacting a phenol having a hydrogen atom on a carbon atom ortho to the hydroxyl group with a cyclohexene in the presence of an aluminum phenoxide catalyst. For example, 6-cyclohexyl-o-cresol is conveniently prepared by reacting o-cresol with cyclohexene in the presence of a small amount of aluminum o-cresoxide.

The temperature employed in this reaction varies from about 50° C. to about 200° C. and reaction times of from one half hour to 10 or more hours are profitably employed to give a good yield of product. The aluminum phenoxide catalyst may be prepared from the phenol employed in the reaction or from some other phenol. Thus, when the phenol itself is a reactant in the process, a small amount of aluminum o-cresoxide may be employed as the catalyst. However, the employment of a different phenol as catalyst leads to a small amount of contamination in the final product. To obtain the elevated temperatures sometimes necessary in this reaction, pressure may be resorted to. However, when reacting a phenol with most of the cyclohexene compounds, atmospheric pressure is sufficient.

When the phenol employed as a reactant is unsubstituted in the 2 and 6 positions, the resulting products are mainly a 2,6-di-substituted phenol and a o-cyclohexyl substituted phenol. These latter compounds may be further reacted with olefins to form the products of this invention. When the phenol employed is substituted in either the 2 or 6 position the process of this invention produces a compound having a cyclohexyl group ortho to the hydroxyl group of the phenol by replacement of the available hydrogen.

The aluminum phenoxide catalyst may be prepared from aluminum metal and the phenol directly, or may be prepared by the reaction of an organic aluminum salt such as aluminum isopropoxide with the phenol.

The following examples illustrate the compounds of this invention and their preparation according to the method outlined above.

Example 1

To a pressure resistant reactor equipped with temperature measuring devices, means for temperature control, means for agitation and means for charging and discharging liquid and solid materials was added 5650 parts of phenol and 45 parts of aluminum wire to prepare the aluminum phenolate catalysts. The vessel was sealed and heated to 200° C. The hydrogen that evolved during the reaction was vented to the atmosphere. After cooling the vessel to 60° C., 5000 parts of cyclohexene were added to the vessel and heating under pressure was again initiated. The mixture was heated to 230° C. during which time the pressure increased to 155 p.s.i.g. The vessel temperature was maintained between 230 and 240° C. for 2 hours over which time the pressure dropped to 35 p.s.i.g. After cooling, the vessel was discharged and the contents diluted with toluene. The resulting mixture was hydrolyzed with a 20 percent hydrochloric acid solution, vented and water washed twice to remove the acid. The organic phase was fractionally distilled in a column packed with stainless steel. The distillation yielded 3675 parts of 2,6-di-cyclohexylphenol which distilled at 210–210.5° at 10 mm. pressure. A quantity of o-cyclohexylphenol was recovered at 159.5 to 160° at 20 millimeters.

Example 2

To the pressure reactant vessel described in the preceding example was added 449 parts of 2-cyclohexylphenol (prepared as in the preceding example), 2 parts of aluminum wire and 43 parts of toluene. The mixture was heated under pressure until a rapid pressure rise was detected. The pressure rise occurred at 255° C. at which point the pressure rose from 45 to 90 p.s.i.g. This was accompanied by a rapid rise in temperature to 270°. After cooling the pressure vessel to 90°, the hydrogen was vented to the atmosphere. Over a 45 minute period, while heating the contents of the vessel between 107 and 114°, pressure was maintained in the range of 50 to 100 p.s.i.g. by the addition of 160 parts of isobutylene. After the isobutylene addition was complete, the reaction mass was cooked for one hour at 108° and after this cook time the vessel's contents were discharged and diluted with toluene and worked up as in Example 1. Distillation in the stainless steel packed column at reduced pressure yielded 491.3 parts of 2-cyclohexyl-6-tert-butyl phenol which distilled at 165–166° at 10 millimeters' pressure. The compound is a liquid and has a refractive index of 1.5326. Infrared analysis showed absorption bands typical of a hindered phenol (with more hindrance than the 2,6-dicyclohexylphenol of Example 1) in which the three substituents on the benzene ring are on successive carbon atoms. Infrared absorption bands typical of both the tertiary butyl group and cyclohexyl group were also present in the spectra. This analysis confirms the compound to be 2-tert-butyl-6-cyclohexylphenol.

Example 3

In the reaction equipment employed in Examples 1 and 2 above, 6490 parts of o-cresol and 45 parts of aluminum were heated to 224° C. under pressure. At this temperature the pressure rose rapidly to 130 p.s.i.g. and the pressure rise was accompanied by a heat rise to 240°. The vessel was then cooled to 60° and the hydrogen resulting from the reaction was vented to the atmosphere. To the vessel was added 4930 parts of cyclohexene. The reaction mass was then heated until a pressure drop was observed. This pressure drop occurred at 235° while the pressure was at 145 p.s.i.g. While the temperature was maintained at about 235° C., the pressure gradually dropped to 35° p.s.i.g. over a 2-hour period. The vessel was cooled, vented and the contents discharged into 6408 parts of toluene. The mixture was then hydrolyzed and water washed as in the preceding examples. Subsequent rectification produced 8138 parts of 6-cyclohexy-o-cresol which distilled at 148–149° C. at 10 millimeters pressure. The melting point of this compound is 67–68°. Infrared analysis confirmed the structure. Carbon and hydrogen analysis showed the compound to contain 83.5 percent carbon and 10.5 percent hydrogen. The calculated content is 83.8 percent carbon and 10.7 percent hydrogen.

Example 4

Following the procedure of Example 1, 100 parts of o-isopropylphenol are reacted with 2 parts of aluminum. After preparation of the catalyst the reaction vessel is pressurized with cyclohexene and the reaction is conducted as in Example 1 above. Work-up of the product produces a good yield of 2-cyclohexyl-6-isopropyl phenol.

Example 5

2 - (4 - nonylcyclohexyl) - 6 - (1,1,3,3 - tetramethylbutyl)phenol is produced by reacting 4-nonylcyclohexene with o-(1,1,3,3-tetramethylbutyl)phenol in the presence of a small amount of the aluminum phenolate of the phenol at 200° C. in the presence of toluene as a solvent.

Example 6

Again employing the general procedure of Example 1, 2-(methylcyclohexyl)-6-sec-eicosyl phenol is prepared by the reaction of the phenol and methyl cyclohexene in the presence of a small amount of the aluminum salt of the phenol as a catalyst.

Example 7

2-(isopropylcyclohexyl)phenol prepared by the alkylation of phenol with isopropylcyclohexene in the presence of aluminum phenolate is reacted at 250° C. with 2-decene in the presence of a small amount of the aluminum salt of 2-(isopropylcyclohexyl)phenol to prepare a good yield of 2-(isopropylcyclohexyl)-6-sec-decylphenol.

The compounds of this invention are outstanding antioxidants. Therefore, an embodiment of this invention is a new composition of matter which comprises organic material normally tending to undergo oxidative deterioration in the presence of air, oxygen or ozone, containing a small antioxidant quantity, up to about 5 percent, of a compound of this invention as described in Formula I above. A preferred embodiment of this invention consists of organic material containing those compounds in which R in Formula I above is an alkyl group having from 1–4 carbon atoms. In this class of compounds, the particularly preferred compounds are those in which R is a methyl or tertiary butyl group. These compounds are particularly preferred since they tend to exhibit the most desirable properties and are readily prepared.

The compounds of this invention find important utility as antioxidants in a wide variety of oxygen sensitive materials. Thus, liquid hydrocarbon fuels such as gasoline, kerosene and fuel oil are found to possess increased storage stability by the use of an antioxidant of this invention. Likewise, liquid hydrocarbon fuels such as gasoline which contain organometallic additives such as tetraethyllead, as well as other organometallic compounds which are used as fuel additives, attain appreciably increased oxidative stability by the practice of this invention. In addition, lubricating oils and functional fluids, both those derived from naturally occurring hydrocarbons and those synthetically prepared, are greatly enhanced by the practice of this invention. The addition of small quantities of the compounds of this invention to such materials as turbine, hydraulic, transformer and other highly refined industrial oils; waxes, soaps and greases; plastics; synthetic polymers such as polyethylene and polypropylene; organometallic compositions such as tetraethyllead and tetraethyllead antiknock fluids; elastomers, including natural rubber; crankcase lubricating oils; lubricating greases; and the like, greatly increase their resistance to deterioration in the presence of air, oxygen or ozone.

The compounds of this invention are also very useful in protecting petroleum wax—paraffin wax and microcrystalline wax—against oxidative deterioration. They also find use in the stabilization of edible fats and oils of animal or vegetable origin which tend to become rancid especially during long periods of storage because of oxidative deterioration. Typical representatives of these edible fats and oils are linsed oil, cod liver oil, castor oil, soybean oil, rapeseed oil, coconut oil, olive oil, palm oil, corn oil, sesame oil, peanut oil, babassu oil, butter fat, lard, beef tallow, and the like.

The compounds of this invention are also very effective antioxidants for high molecular weight unsaturated hydrocarbon polymers, such as polybutadiene, methyl rubber, polybutene rubber, natural rubber, butyl rubber, GR–S rubber, GR–N rubber, piperylene rubber, dimethyl butadiene rubber and the like. Thus a preferred embodiment of the present invention is a rubber containing as an antioxidant therefor, a 2,6-di-substituted phenol as defined above. Another part of this invention is the method of preserving rubber which comprises incorporating therein a 2,6-di-substituted phenol of this invention as defined above. The stabilizer is incorporated into the rubber by milling, Banbury mixing, or similar process, or is emulsified and the emulsions added to the rubber latex before coagulation. In the various embodiments of this invention the stabilizer is used in small amounts, generally ranging from about 0.01 to about 5.0 percent, based on the rubber.

As used in the description and claims, the term "rubber" is employed in a generic sense to define a high molecular weight plastic material which possesses high extensibility under load coupled with the property of forcibly retracting to approximately its original size and shape after the load is removed. It is preferable that the rubber be a sulfur-vulcanizable rubber, such as India rubber, reclaimed rubber, balata, gutta percha, rubbery conjugated diene polymers and copolymers exemplified by the butadienestyrene (GR–S) and butadiene-acrylonitrile (GR–N or Paracril) rubbers and the like, although the invention is applicable to the stabilization of any rubber, high molecular weight organic material which is normally susceptible to deterioration in the presence of oxygen, air, or ozone. The nature of these rubbers is well known to those skilled in the art.

Among the definite advantages provided by this invention is that the present rubber compositions possess unusually great resistance against oxidative deterioration. Moreover, these compositions exhibit excellent non-staining and non-discoloration characteristics. Furthermore, the novel stabilizer is relatively inexpensive and easily prepared, and possesses the highly beneficial property of low volatility. As is well known, a highly desirable feature of a rubber antioxidant is that it have a low volatility so that it remains admixed with the rubber during vulcanization and related process steps.

The rubber compositions of the present invention are illustrated by the following specific examples wherein all parts and percentages are by weight.

Example 8

To illustrate the enhanced oxygen resistance of the rubber compositions of this invention and their excellent non-staining and non-discoloration characteristics, a light-colored stock is selected for test. This stock had the following composition:

| | Parts by weight |
|---|---|
| Pale crepe rubber | 100.00 |
| Zinc oxide filler | 50.00 |
| Titanium dioxide | 25.00 |
| Stearic acid | 2.00 |
| Ultramarine blue | 0.12 |
| Sulfur | 3.00 |
| Mercaptobenzothiazole | 1.00 |
| | 181.12 |

To the above base formula is added one part by weight of 2-methyl-6-cyclohexylphenol and individual samples are cured for 20, 30, 45 and 60 minutes at 274° C. using perfectly clean molds with no mold lubricant. Another set of samples of the same base formula which do not contain an antioxidant are cured under the same conditions.

To demonstrate the protection afforded to the rubber by the practice of this invention, the tensile strength and the ultimate elongation of stocks prepared by the addition of the inhibitor are determined before and after aging. These properties are also determined on the inhibitor-free stocks. The aging is accomplished by conducting the procedure of ASTM Designation: D–572–52, described in the ASTM Standards for 1952, Part 6, for a period of 168 hours at a temperature of 70° C. with an initial oxygen pressure in the test bomb of 300 p.s.i.g.

The tensile strength and the ultimate elongation of the test specimens before and after aging are measured by ASTM Test Procedure, D–412–51T (ASTM Standards for 1952, Part 6). The tensile strength is the tension load per unit cross-sectional area required to break a test specimen, while the ultimate elongation is the elongation at the moment of rupture of a test specimen. A decrease in the values for either of these properties upon aging represents a decrease in the usefulness of the article fabricated therefrom, so that the degree to which these properties are retained is a direct measure of the utility of the protective substance.

Measurements are also made of the increase in weight of the test specimens which occur during the accelerated aging. This is a direct measure of the oxygen up-take of the samples and provides another criterion of the effectiveness of an inhibitor in suppressing oxidative deterioration of the rubber. Thus, the larger the weight increase, the greater is the deterioration and the less effective is the inhibitor.

In all the above tests, the composition compounded with 2-methyl-6-cyclohexylphenol gives results which show this additive to be an excellent antioxidant.

Example 9

To a synthetic rubber master batch comprising 100 parts of GR–S rubber having an average molecular weight of 60,000, 50 parts of mixed zinc propionate-stearate, 50 parts of carbon black, 5 parts of road tar, 2 parts of sulfur and 1.5 parts of mercaptobenzothiazole is incorporated 1.5 parts of 6-cyclohexyl-o-cresol. This batch is then cured for 60 minutes at 45 p.s.i. of steam pressure.

Example 10

Natural rubber stock is compounded according to the following formula:

| | Parts |
|---|---|
| Thick gristly crepe natural rubber | 100 |
| Wax | 2 |
| Ultramarine dye | 0.1 |
| Zinc oxide | 70 |
| Titanium dioxide | 20 |
| Sulfur | 3 |
| Stearic acid | 1.2 |
| 2,6-bis-(4-methylcyclohexyl)phenol | 1 |
| Benzothiazyl disulfide | 0.4 |
| Amine activator | 0.5 |

This stock is then vulcanized for 60 minutes at 280° F.

Example 11

A butadiene-acrylonitrile copolymer is produced from butadiene-1,3 and 32 percent of acrylonitrile. Two percent based on the dry weight of the copolymer of 6-(2-isoproylcyclohexyl)-o-cresol is added as an emulsion in sodium oleate solution to the latex obtained from emulsion copolymerization of the monomers. The latex is coagulated with a pure grade of aluminum sulfate and the coagulum, after washing, is dried for 20 hours at 70° C.

Example 12

Three percent of 2-ethyl-6-cyclohexylphenol emulsified in sodium oleate is added to a rubber-like copolymer of butadiene-1,3 and styrene containing 25 percent of combined styrene.

Example 13

A rubber stock is compounded from 100 parts of smoked sheet rubber, 60 parts of zinc oxide, 20 parts of lithopone, 2 parts of sulfur, 0.7 part of diphenyl guanidine phthalate, 0.8 part of benzoyl thiobenzothiazole, 0.2 part of paraffin and 2 parts of 2-tert-butyl-6-cyclohexylphenol. The stock so compounded is cured by heating for 45 minutes at 126° C. in a press.

Example 14

Two parts of 2(α-ethyl-4-methylbenzyl)-6-cyclohexylphenol are incorporated in 100 parts of raw butyl rubber prepared by the copolymerization of 90 percent of isobutylene and 10 percent of isoprene.

Example 15

To 200 parts of raw butyl rubber prepared by copolymerization of 95 percent of isobutylene and 5 percent of butadiene is added 1.5 parts of 2-cyclohexyl-6-tert-amylphenol.

Example 16

To a master batch of GR–N synthetic rubber comprising 100 parts of GR–N rubber, 5 percent of zinc stearate, 50 parts of carbon black, 5 parts of road tar, 2 parts of sulfur and 2 parts of mercaptobenzothiazole is added 5 percent based on the weight of the batch of 6-(4-nonylcyclohexyl)-o-cresol.

Example 17

To a natural rubber (Hevea) is added 0.1 percent of 2-tert-octyl-6-cyclohexylphenol.

Each of the above illustrated rubber compositions of this invention possesses greatly improved resistance against oxidative deterioration as compared with the corresponding rubber compositions which are devoid of an antioxidant. More over, the light-colored stocks of the above examples exhibit virtually no discoloration or staining characteristics even when subjected to severe weathering conditions and the like. The methods of formulating the improved rubber compositions of this invention will now be clearly apparent to those skilled in the art.

The amount of stabilizer employed in the rubber compositions of this invention varies from about 0.01 to about 5 percent by weight based on the weight of the rubber. The amount used depends somewhat upon the nature of the rubber being protected and the conditions of service to be encountered. Thus, in the stabilization of natural and synthetic rubber to be used in the manufacture of tires which are normally subjected to exposure to the elements, as well as to the action of sunlight, frictional heat, stress and the like, the use of relatively high concentrations of this inhibitor is advantageous. On the other hand, when the article of manufacture is not to be subjected to such severe conditions, relatively low concentrations can be successfully utilized. Generally speaking amounts ranging from about 0.1 to about 3 percent by weight give uniformly satisfactory results.

Other rubbers and elastomers which can be preserved according to this invention are the rubbery polymerizates of isoprene, butadiene-1,3, piperylene; also the rubbery copolymer of conjugated dienes with one or more polymerizable monoolefinic compounds which have the capability of forming rubber copolymers with butadiene-1,3, outstanding examples of such monoolefinic compounds being those having the group $CH_2=C$, exemplified by styrene. Examples of such monoolefins are styrene, vinyl naphthalene, alpha methyl styrene, p-chlorostyrene, dichlorostyrene, acrylic acid, methyl acrylate, methyl methacrylate, methacrylonitrile, methacrylamide, methyl vinyl ether, methyl vinyl ketone, vinylidine chloride, vinyl carbazole, vinyl pyridines, alkyl-substituted vinyl pyridines, etc. In fact, excellent stabilization is achieved by incorporating a compound of this invention in any of the well known elastomers which are normally susceptible to deterioration in the presence of air, such a elastoprenes, elastolenes, elastothiomers, and elastoplastics.

As pointed out above, the compounds of this invention are effective antioxidants when added to other organic compositions normally tending to undergo deterioration in the presence of air, oxygen or ozone. The following examples illustrate various embodiments of this aspect of the invention.

Example 18

To a master batch of high molecular weight polyethylene having an average molecular weight of about 1,000,000, a tensile strength of 6,700 p.s.i., a Shore D hardness of 74 and a softening temperature under low load of 150° C. is added 5 percent of 2-isopropyl-6-(3-ethylcyclohexyl)phenol to prepare a composition of outstanding oxidative stability.

Example 19

A linear polyethylene having a high degree of crystallinity, up to 93 percent, and below one ethyl branched chain per 100 carbon atoms, a density of about 0.96 gram per milliliter and which has about 1.5 double bonds per 100 carbon atoms, is treated with $50 \times 10^{-6}$ roentgens of β-radiation. To the thus irradiated polymer is added 0.005 percent of 6-cyclohexyl-o-cresol and the resulting product has better stability characteristics.

Example 20

Two parts of 2-isopropyl-6-cyclohexylphenol are added with milling to 100 parts of a low density polyethylene prepared by high pressure polymerization and which has an average molecular weight of 18,000 to 20,000. The resulting product is vastly improved in its oxidative stability.

Example 21

To 10,000 parts of a polyethylene having an average molecular weight of about 100,000 and which has a tensile strength of 5400 p.s.i., a Shore D hardness of 70 and a softening temperature of 130° C. under low load, is added 10 parts of 2-tert-butyl-6-cyclohexylphenol to prepare a composition of outstanding oxidative stability.

Liquid hydrocarbon fuels employed in the operation of spark ignition combustion engines are also vastly improved in their storage stability by the practice of this invention. Table I, below gives the compositions of a number of typical commercial gasolines which may be stabilized against oxidative deterioration by the inclusion therein of a compound of this invention.

TABLE I.—GASOLINE COMPOSITIONS

| Gasoline | Percent Aromatics | Percent Olefins | Percent Saturates | Gravity, °API |
|---|---|---|---|---|
| A | 26.6 | 20.8 | 52.6 | 62.1 |
| B | 8.6 | 7.9 | 83.5 | 68.5 |
| C | 20.0 | 41.2 | 38.8 | 62.9 |
| D | 20.5 | 32.9 | 46.6 | 63.5 |
| E | 38.1 | 7.3 | 54.6 | 59.3 |

Example 22

To 1,000 parts of Gasoline A, as described in Table I, is added 10 parts of 2-tert-amyl-6-(4-methylcyclohexyl)phenol.

Example 23

To 10,000 parts of Gasoline B is added 500 parts of 6-cyclohexyl-o-cresol.

Example 24

To 10,000 parts of Gasoline C is added one part of 2-sec-octyl-6-cyclohexylphenol.

Most gasolines in commercial use also contain an organometallic antiknock agent and certain scavengers therefor. The antiknock agent most frequently employed is tetraethyllead. The scavengers are ordinarily halohydrocarbon compounds of chlorine and bromine. Most widely used of these are ethylene dibromide and ethylene dichloride. In addition, gasolines often contain other additives such as dyes and phosphorus containing corrective agents. These gasoline compositions containing additives are also protected against oxidative deterioration by the practice of this invention as demonstrated by the following examples.

Example 25

To 10,000 parts of Gasoline D, which contains 2.39 g./gal. of tetraethyllead and one theory of bromine as ethylene dibromide, is added 100 parts of 2-ethyl-6-cyclohexyl phenol.

Example 26

To 1,000 parts of Gasoline E, which contains 2.47 g./gal. of lead as tetraethyllead, one theory of chlorine as ethylene dichloride, 0.5 theory of bromine as ethylene dibromide and 0.2 theory of phosphorous as tris-($\beta$-chloroisopropyl)-thionophosphate, is added 5 parts of 6-cyclohexyl-o-cresol.

The tetraethyllead antiknock additive is supplied to oil companies as a mixture already containing the necessary dyes and scavengers. These mixtures, which are commonly known as antiknock fluid compositions, are also protected against oxidative deterioration by the practice of this invention.

Example 27

To an antiknock fluid composition which is to be used as an additive to gasoline and which contains 61.5 parts of tetraethyllead, 17.9 parts of ethylene dibromide and 18.8 parts of ethylene dichloride is added with agitation 1.3 parts of 2-($\alpha$-methylbenzyl)-6-cyclohexylphenol. The resulting composition is stable for long periods when exposed to air.

Example 28

To 1,000 parts of commercially available diesel fuel having an octane number of 51.7 and a 50 percent evaporation temperature of 509° F. is added 3 parts of 2-($\alpha,\alpha$-dimethylbenzyl)-6-cyclohexylphenol. The resulting fuel is stable to oxidative deterioration.

The compounds of this invention are also useful in preventing oxidative deterioration in lubricating oil compositions. Thus, an embodiment of this invention is a lubricating oil normally susceptible to oxidative deterioration containing a small antioxidant quantity, up to 5 percent, of a compound of this invention as defined above.

To prepare the lubricants of this invention, an appropriate quantity—from about 0.001 to about 5 percent and preferably from about 0.25 to about 2 percent—of the compound of this invention is blended with the base oil to be protected. Suitable base oils include mineral oils and also synthetic diester oils, such as sebacates, adipates, etc., which find particular use as aircraft instrument oils, hydraulic and damping fluids and prevision bearing lubricants. All of these base oils are normally susceptible to oxidative deterioration, especially at elevated temperatures.

The finished lubricants of this invention have much greater oxidation stability and many other improved performance characteristics as compared with the corresponding base oils.

The following examples illustrate the preferred lubricating oil compositions of this invention.

Example 29

To 1,000 parts of a solvent refined neutral oil (95 VI and 200 SUS at 100° F.) containing 6 percent of a commercial methacrylate type VI approver which gives the finished formulation of a VI of 140 and a viscosity of 300 SUS at 100° F. is added 5 percent of 2-sec-octyl-6-cyclohexylphenol.

Example 30

To an additive-free solvent refined crankcase lubricating oil having a viscosity index of 95 and a SAE viscosity of 10 is added 0.001 percent of 2-ethyl-6-(3-propylcyclohexyl)phenol.

Example 31

To 100,000 parts of a petroleum hydrocarbon oil having a gravity of 30.3° API at 60° F., a viscosity of 178.8 SUS at 100° F., a viscosity index of 154.2 and which contains 0.2 percent sulfur, is added 200 parts of 2-(cyclohexyl)-6-tert-butylphenol. The resulting oil possesses greatly enhanced resistance to oxidative deterioration.

Example 32

To 100,000 parts of a commercially available pentaerythritol ester having a viscosity at 100° F. of 22.4 centistokes, and known in the trade as "Hercoflex 600" is added 400 parts (0.4 percent) of a 2-methyl-6-(2-butylcyclohexyl)phenol. The resulting finished oil possesses markedly improved resistance against oxidative deterioration.

Example 33

To 100,000 parts of dioctyl sebacate having a viscosity of 210° F. of 36.7 SUS, a viscosity index of 159 and a molecular weight of 426.7 is added 250 parts (0.25 percent) of 6-cyclohexyl-o-cresol.

To illustrate the benefits obtained by the practice of this invention, a standard oil oxidation test is used. The equipment and test procedure described by Kroger et al., Erdol and Kohle, 2, page 398 (1949) served as a basis for the tests. The equipment and procedures are slightly modified in order to make the oxidizing conditions more strenuous. In this manner the test lubricants are subjected to severe oxidizing conditions in order to conclusively establish the effectiveness of additives under very adverse conditions. Furthermore, the modifications are found to provide results which correlated extremely well with test results of other standard procedures, including actual engine tests.

The equipment consists of a reaction cell connected with an open end manometer whereby the total uptake of oxygen by the oil is determined by noting the drop in height of the mercury in the manometer. The test oil sample is placed in the reaction cell which is then flushed with oxygen and the temperature is then raised and held at that selected for the test until the substrate oil undergoes catastrophic oxidation which is shown by a rapid oxygen uptake. In all cases, the test oil is deliberately contaminated with iron hexoate as an oxidation promoter. In tests of this nature, the oxidation stability of a test lubricant is determined by measuring its induction period, that is, the time required for catastrophic deterioration under the above outlined conditions. The longer the induction period, the more stable the lubricant. In tests of this nature lubricants containing an additive of this invention give excellent results.

The compounds of this invention are also useful as additives to functional fluids and automatic transmission fluids. The primary constituent of a functional fluid is a refined mineral lubricating oil having carefully selected minimum viscosity of 49 Saybolt Universal Seconds (SUS) at 210° F. and a maximum viscosity of 7,000 SUS at 0° F., generally a distillate oil, lighter than an SAE 10 motor oil. The oil usually amounts to between about 73.5 to about 97.5 percent by weight of the finished fluid. Preferably, the base oil is selected from a paraffin base distillate such as a Pennsylvania crude.

The fluids usually contain compounds which are characterized by containing one or more organic components which may be alkyl, aryl, alkaryl or aralkyl groups that are bonded to one or more metal atoms through coupling groups such as sulfonate, hydroxyl, carboxyl and mercaptan. The metal atoms may be aluminum, calcium, lithium, barium, strontium, and magnesium. The organic components contain solubilizing groups such as high molecular weight straight or branched chain paraffins, aromatic or naphthenic rings, or contain a halogen. These metal compounds are present in the compounded fluid in a concentration range of between about 0.1 to about 5 percent by weight. These compounds include alkaline-earth metal salts of phenyl-substituted long chain fatty acids, alkaline-earth metal salts of the capryl or octyl esters of salicylic acid, the alkaline-earth metal salts of petroleum sulfonic acids, the alkaline-earth metal salts of alkyl-substituted phenol sulfides, the salt of aluminum or the alkaline-earth metals with cetyl phenol, and the metal salts of wax-substituted phenol derivatives. Another class of additives are the so-called overbased phenates and sulfonates, which can be prepared by reaction between an alkyl phenol or alkyl phenol sulfide and an alkaline-earth metal oxide or hydroxide at an elevated temperature. The overbased phenate formed from the reaction contains up to two or three times as much metal as the normal phenate.

In addition, functional fluids may contain additional components which improve the properties of the fluid. Typical components and their concentration range in the fluid are as follows:

From about 1 to about 5 percent of an anti-squawk additive, usually a sulfurized oil, such as sulfurized sperm oil, sulfurized lard, sulfurized vegetable oil, sulfurized glyceride, or a sulfurized ester of fatty acids.

From about 0.05 to about 2 percent of a pour point depressant. Typical types of additives are wax-substituted naphthalenes, esters of wax-substituted phenol, polymerized unsaturated esters and acrylic polymers such as polymerized esters of methacrylic acid.

About 0.005 to about 0.1 percent of a foam inhibitor. Foam inhibitors include fatty acids and fatty acid esters, pine oil, alkyl lactates, higher ethers such as 2-(di-tert-amyl phenoxy) ethanol and mixtures of materials such as glycerol and sodium bis (2-ethylhexyl)sulfosuccinate.

From about 0.03 to about 0.1 percent of a rust preventive such as carboxylic acid derivatives including alkylated succinic acid, esters and partial esters of di- and polycarboxylic acids, esters and partial esters of hydroxy-substituted di- and polycarboxylic acids and alkyl-substituted acids containing at least two carboxylic acid groups joined by nitrogen, oxygen or sulfur esters of acids derived from oxidized petroleum; amine derivatives including hydroxy amines, hydroxy amidines, amine salts of partial esters of phosphorus acids, hydroxy amine salts of oxidized petroleum acids, hydroxy amine salts of fatty acids and long chain alkyl amines; organic sulfonates; long chain alkyl ketones; organic phosphates and phosphites; morpholine derivatives and phosphatides including lecithin and fatty acids.

About 0.1 to about 2 percent of an extreme pressure agent. These include organic compounds containing chlorine, phosphorus and sulfur, such as chlorinated waxes of a $P_2S_5$-terpene reaction product; organic phosphates and phosphites such as for example, tricresylphosphate or a zinc dialkyl dithiophosphate and lead soaps such as lead naphthenate.

From about 0.05 to about 0.2 percent of a metal deactivator. Such compounds include complex organic nitrogen and sulfur-containing compounds, as for example, amines and sulfides. Also included are such compounds as organic dihydroxyphosphines, trialkyl and triaryl phosphites, certain diamines and soaps containing a metal such as tin, nickel, chromium, thallium or titanium.

From about 1 to about 10 percent of a viscosity index improver such as polymerized olefin or isoolefin, butylene polymer or alkylated styrene polymer.

The following examples show typical functional fluids of this invention. The fluids are formed by mixing the ingredients together, while heating the oil to a temperature up to 200° F.

*Example 34*

A fluid of this invention is prepared by blending 80 parts of a conventionally-refined Pennsylvania mineral oil (99 SUS at 100° F.), 2 parts of 2-ethyl-6-cyclohexyl phenol, 5 parts of barium petroleum sulfonate, 10 parts of a polyacrylate having a molecular weight of approximately 7,000 derived from a fatty alcohol such as cetyl or lauryl alcohol, 0.1 part of a dimethyl silicone polymer anti-foam agent, 2 parts of a dialkyl zinc dithiophosphate and 0.9 part of a dark, viscous liquid having a viscosity of 560 SUS at 210° F., a flash point of 420° F., a pour point of 30° F. and a specific gravity of 60/60° F. of 0.919.

*Example 35*

Another such fluid consists of 95 parts of a solvent-refined, light acid-treated, clay-contacted, solvent dewaxed paraffin base distillate mineral oil (110 SUS at 100° F.); 0.1 part of 6-cyclohexyl-o-cresol; 0.1 part of calcium octyl phenol sulfide; 2 parts of a sulfurized sperm oil having a sulfur content between 10–12 percent, a viscosity of 210° F. of 200 SUS and a pour point of 65° F.; 0.3 part of an ester of an aromatic acid and wax-alkylated phenol having a molecular weight of approximately 450; 2.5 parts of a linear pale color isobutylene polymer of a controlled molecular weight having a viscosity of 3,000 SUS at 210° F., a specific gravity 60/60° F. of 0.875.

*Example 36*

An automatic transmission fluid is made by mixing 97 percent of an oil blend comprising 59.0 parts of a solvent extracted, Coastal oil, 40 SUS at 210° F.; 1.0 part of 2-tert-butyl-6-cyclohexyl phenol; 1.0 part of a barium phenol sulfide containing 2.4 percent barium, 2 percent calcium and 3.5 percent sulfur, having a viscosity of 126 SUS at 210° F., a flash point of 430° F., a pour point of 10° F. and a specific gravity 60/60° F. of 0.97; 1.0 part of sulfurized sperm oil.

*Example 38*

96 parts of a conventionally-refined Pennsylvania mineral oil (99 SUS at 100° F.); 2 parts of 2-methyl-6-cyclohexyl phenol; 2 parts of a mixed barium phenol sulfide-calcium sulfonate containing 5.7 percent barium, 0.68 percent calcium and 2.9 percent sulfur, having a viscosity of 92 SUS at 210° F., a flash point of 410° F., a pour point of 10° F. and a specific gravity 60/60° F. of 0.988 are blended into an effective fluid of this invention.

We claim:

A compound having the formula

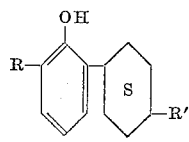

where R is an aralkyl radical having from 8 to about 18 carbon atoms and containing at least one alkyl substituent on the alpha carbon atom thereof; R' is selected from the group consisting of hydrogen and an alkyl radical having from one to about 9 carbon atoms.

References Cited by the Examiner

UNITED STATES PATENTS 2,703,324  3/55  Binkley et al.

OTHER REFERENCES

Lefebvre, Chem. Abstracts, 40:2127 (1946), (1 page).
Levas, Chem. Abstracts, 42:5885 (1948), (1 page).
Stroh et al., Chem. Abstracts, 52:6244–46 (1958), (2 pages).
Rosenwald et al., Industrial & Eng. Chem., 42:162–165 (1950), 4 pages.

LEON ZITVER, *Primary Examiner.*

CHARLES B. PARKER, *Examiner.*